Aug. 27, 1968  V. J. RIGOLINI  3,399,376
PHOTOGRAPHIC APPARATUS
Filed Aug. 19, 1966  3 Sheets-Sheet 1
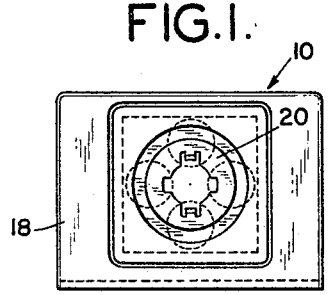
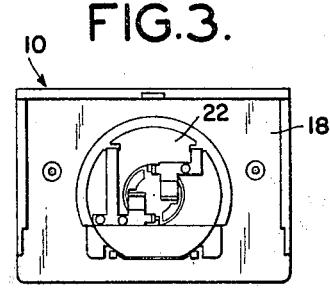
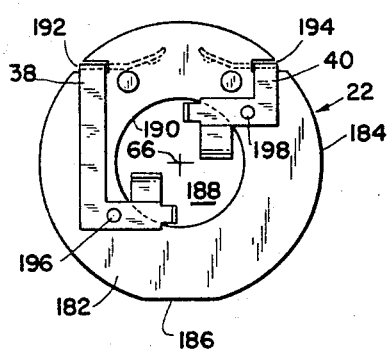
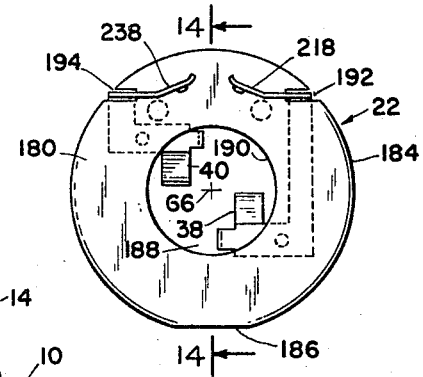
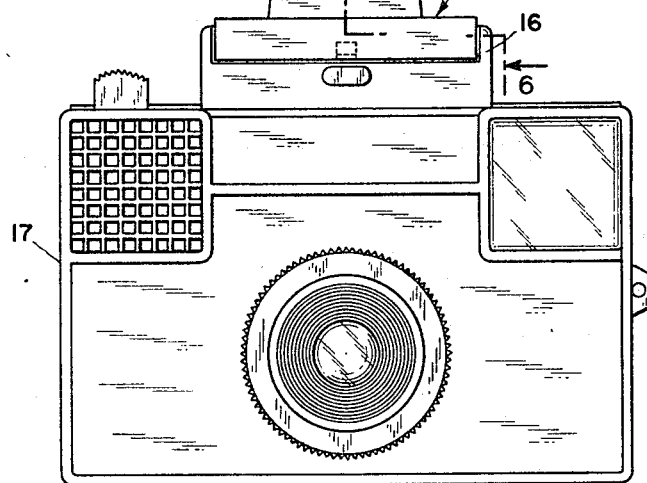
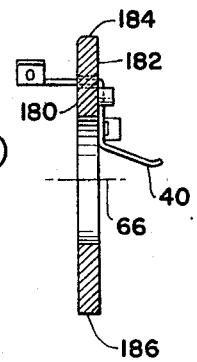

Aug. 27, 1968 V. J. RIGOLINI 3,399,376
PHOTOGRAPHIC APPARATUS
Filed Aug. 19, 1966 3 Sheets-Sheet 2
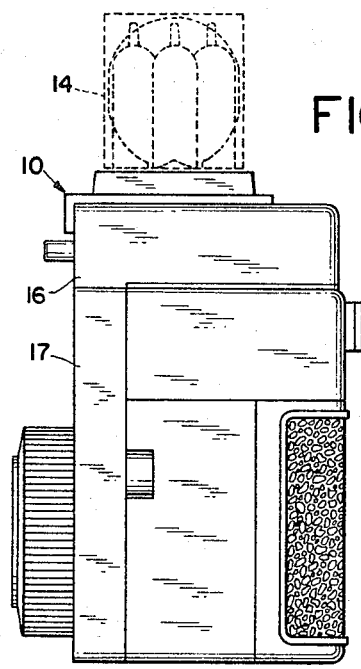
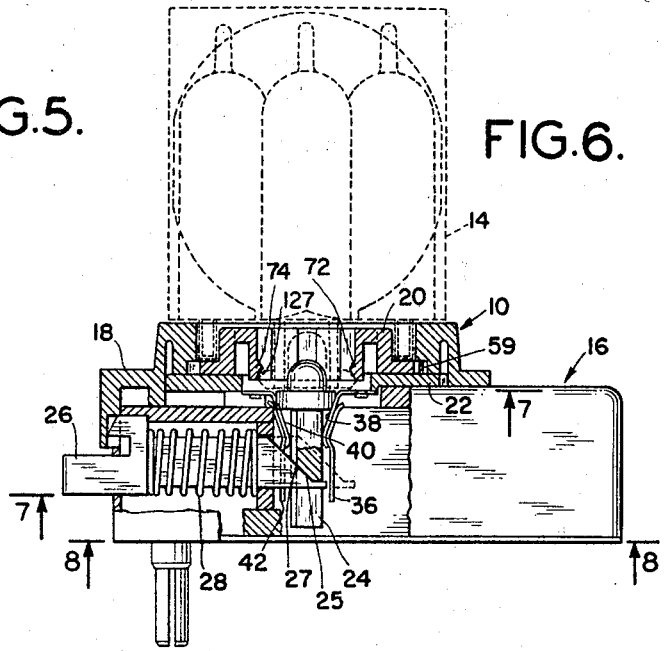
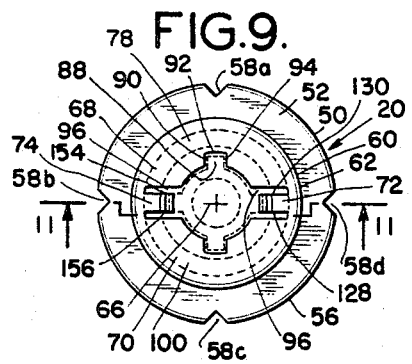
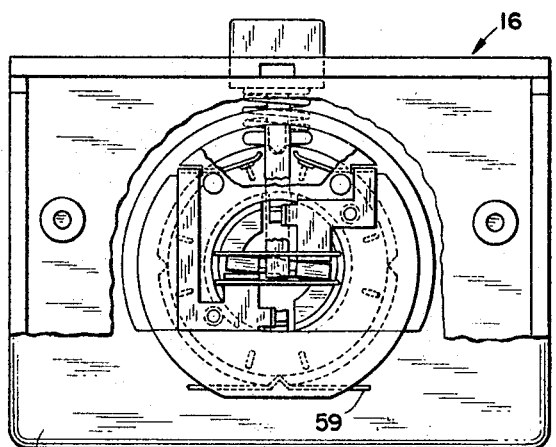
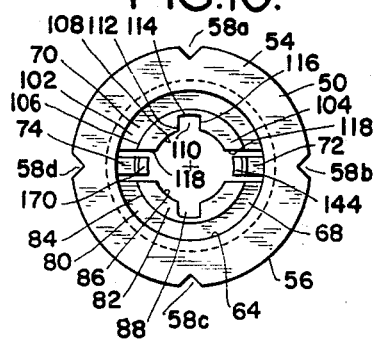
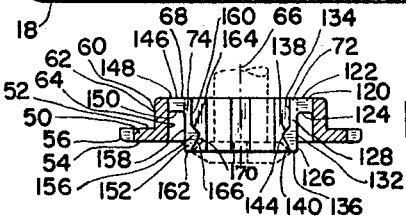

Aug. 27, 1968     V. J. RIGOLINI     3,399,376
PHOTOGRAPHIC APPARATUS
Filed Aug. 19, 1966     3 Sheets-Sheet 3
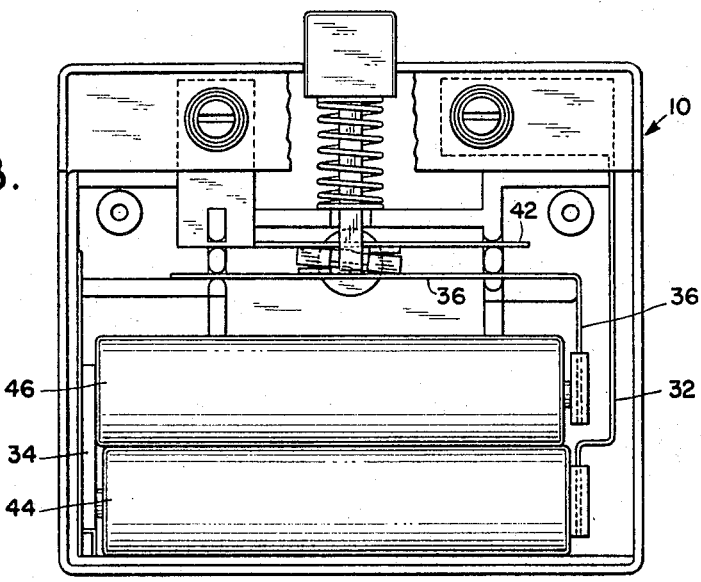
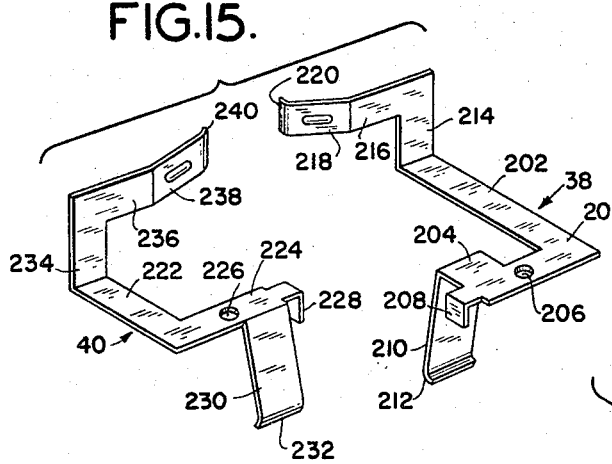
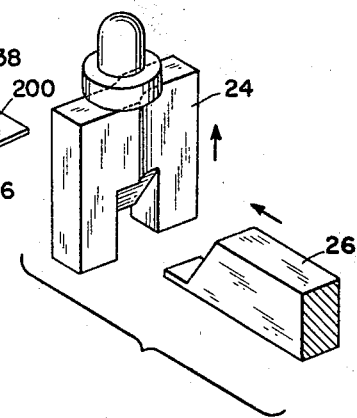
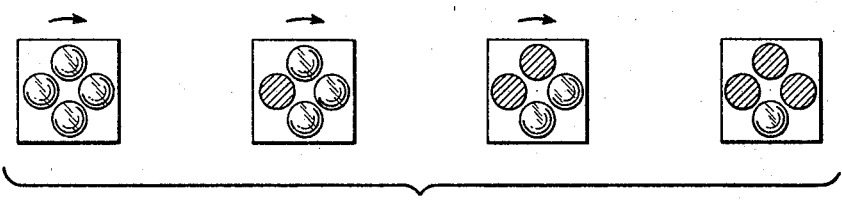

United States Patent Office 3,399,376
Patented Aug. 27, 1968

3,399,376
PHOTOGRAPHIC APPARATUS
Venerio J. Rigolini, Brooklyn, N.Y., assignor to Whitehouse Products, Inc., Brooklyn, N.Y., a corporation of New York
Filed Aug. 19, 1966, Ser. No. 573,542
6 Claims. (Cl. 339—147)

ABSTRACT OF THE DISCLOSURE

A flashcube mounting base including an all plastic flashcube socket for use on a photographic camera having a flash device. The base to which the flashcube is mounted connects the latter to the flash circuitry of the camera and permits manual rotation of the flashcube.

---

The present invention is directed to flash picture mechanisms for still picture cameras and more particularly is directed to a socket for using flashcubes in a flash unit of a camera.

The flashcube is a fairly recent development in the photographic supply industry and is a single unit containing four reflectors and four AG-1 flash bulbs, which are two-pronged and substantially cylindrical, one behind each of its transparent faces. Each flash bulb has a mass of wire which burns producing a bright light when an electric current is passed through it. Each of the ends of the wire is connected to external contacts which project outside the sealed unit to contact a source of electrical energy. The flashcube is generally cubic in appearance, being substantially planar on each of its five flat sides. The sixth side or base of the flashcube is generally planar and contains a projecting supporting member and eight projecting electrical contacts, two for each flash bulb. The base of the flashcube has a distinctly different structure from the usual two pronged flash bulb. Cameras and flash attachments which are designed for use with two pronged flash bulbs are physically incapable of use with flashcubes.

A camera for use with a flash bulb or flash attachment comprises, in part, electrical circuitry synchronizing an electrical impulse with the opening of its shutter. The electrical impulse may come from internal or external batteries and is conducted by appropriate circuitry through a flash bulb external to the camera.

A flash attachment usually is comprised of a housing, means inside the housing for supporting batteries, electrical conductors connecting the batteries into the internal circuit of the camera (these may in part consist of plugs which support the housing and attach it to the camera), electrical circuits connecting the batteries to a flash bulb, and a socket for retaining a flash bulb. The term "camera flash unit" is used to describe both flash attachments and those units integral with a camera.

It is an object of the present invention to provide apparatus for supporting a flashcube in operable relation with a still picture flash camera.

It is another object of the present invention to provide a novel base for holding flashcubes in operative relation in a flash attachment which base permits manual rotation of the flashcube as successive bulbs are discharged.

It is another object of this invention to provide an adapter for a still camera flash unit designed for AG-1 flash bulbs which permits the flash unit to use flashcubes.

FIGURE 1 is a top view of one embodiment of a flashcube base according to the present invention;

FIGURE 2 is a side elevational view of the flashcube base of FIGURE 1;

FIGURE 3 is a bottom view of the flashcube base of FIGURE 1;

FIGURE 4 is a front elevational view of a camera with a flash attachment embodying the features of the present invention connected to it and having a flashcube shown in phantom;

FIGURE 5 is a side elevational view of the camera flash attachment and flashcube of FIGURE 4;

FIGURE 6 is a sectional view taken generally along lines 6—6 of FIGURE 4, showing the relationship of the parts of the flash attachment of FIGURES 4 and 5, and a flashcube;

FIGURE 7 is a view of the under-surface of the flash attachment of FIGURE 6, taken generally along lines 7—7 of FIGURE 6;

FIGURE 8 is a bottom view of a flash attachment taken generally along lines 8—8 of FIGURE 6, and showing electrical circuitry;

FIGURE 9 is a plan view of one embodiment of the flashcube socket of the present invention;

FIGURE 10 is a bottom view of the flashcube socket of FIGURE 9;

FIGURE 11 is a sectional view taken generally along lines 11—11 of FIGURE 9;

FIGURE 12 is a bottom view of a socket retainer used in conjunction with the flashcube socket of FIGURES 9 and 10 and showing electrical circuit elements;

FIGURE 13 is a top view of the socket retainer of FIGURE 12;

FIGURE 14 is a sectional view taken generally along lines 14—14 of FIGURE 13;

FIGURE 15 is an exploded perspective view showing the circuit elements associated with the socket retainer of FIGURES 12-14;

FIGURE 16 is a perspective view showing a flashcube ejector, the relative location of the operating arm of the ejector button and the relationship between the camming surfaces of the ejector and the ejector button;

FIGURE 17 is a series of diagrammatic views showing the relative position of a flashcube as the bulbs comprising it are successively discharged.

While it is preferred that the flashcube socket of the present invention be permanently built into the flash unit, the socket may form part of an adapter for reversibly converting a flash unit from use with AG-1 flash bulbs to use with flashcubes. The flashcube base in such use may be mounted in the socket provided for an ordinary two prong flash bulb.

The objects of the present invention may be achieved by the use of a flashcube base such as is shown in FIGURES 1, 2 and 3. There the flashcube base 10 may be seen to be comprised of a housing 18, a flashcube socket 20 and a socket retainer 22.

In one embodiment, the present invention comprises a housing, a socket designed to retain a flashcube, a socket retainer for holding the socket in the housing, and electrical conductors connecting one portion of the flashcube to the flash bulb circuit of the flash attachment, or camera. The electrical conductors also serve to retain the adapter in the flash attachment. The flashcube may be manually rotated in the socket to bring other portions of the flashcube into electrical connection with the camera shutter tripping mechanism. An especially advantageous embodiment is shown in FIGURES 4 and 5 in which a flash attachment 16 is connected to a camera 17. The flashcube 14 may be mounted directly into the flash attachment 16 and is then ready for use.

An enlarged view of a flash attachment including a flashcube base is shown in FIGURES 6 and 7. There the flashcube base 10 is shown connected into the flash attachment 16. The conductors 38 and 40 are attached to the socket retainer 22 and are shaped so as to engage the electrical conductors 36 and 42 which are part of the flash attachment and are held firmly in place by them. The connection may be made permanent by use of an adhesive or contacting surface or the entire flashcube adapter 10 may be held in firm position against the flash attachment 16 by the action of the electrical conductors 38 and 40.

As may be seen in FIGURE 6, the flashcube 14 extends down into the socket 20 and is held in place by locking legs 72, 74 engaging two of the fingers 127 which form part of the flashcube base. The insertion of the flashcube not only causes the base of the flashcube to be locked in place by the locking legs 72, 74 but also depresses the ejector 24. After the flashcube has been spent on all four sides, the flashcube may be ejected by forcing the surface 27 of push rod 26 against the camming surface 25 of the ejector. This causes the ejector to be actuated upwardly towards the flashcube 14 and serves to mechanically push the flashcube fingers 127 out of engagement with the lips of the locking legs. A spring 28 returns the push rod to its normal position. It is a feature of the present invention that the flashcube base may be used in conjunction with the flash camera and flash attachments which include a spent bulb ejection means made up of a push rod ejector.

As may be seen in FIGURES 9, 10 and 11, the socket 20 is formed into a typical configuration, preferably a molded unit, and preferably made of Delrin. A flange 50 is defined by an upper surface 52, a lower surface 54, and a circumferential portion 56. Four detents 58a, 58b, 58c and 58d corresponding to the four bulbs of the flashcube are defined equally spaced in the flange substantially 90 degrees apart, as may be seen in FIGURES 9 and 10. The detents cooperate with indexing spring 59 mounted in the housing 18, FIGURE 7.

The flange 50 supports a regular cylindrical wall 60 defined by an outer circumferential surface 62 and an inner circumferential surface 64. The cylindrical wall 60 is disposed about a central axis 66. The cylindrical wall 60 supports arcuate planar members 68 and 70 and resilient retaining members 72 and 74. The arcuate planar member 68 has upper surface 78 and lower surface 80 and supports an arcuate portion 82 disposed inside the cylindrical wall 60, and concentric about the central axis 66. The arcuate portion 82 is defined by an outer surface 84 and an inner surface 86. A slot 88 is defined in arcuate member 68 by walls 90, 92 and 94. The chord of the arcuate planar member 68 is defined by surface 96.

Similarly, the arcuate planar member 70 has an upper surface 100 and a lower surface 102, and supports an arcuate portion 104 defined by an outer surface 106 and an inner surface 108. A slot 110 is defined in the arcuate portion 104 by walls 112, 114 and 116. The chord of the arcuate member 70 is defined by surface 118.

The chord surfaces 96 and 118 are substantially parallel to one another and are symmetrical about a plane passing through a central axis 66 and the center portion of the detents 58b and 58d. The arcuate members 68 and 70 are substantially symmetrical about a plane passing through the central axis 66 and the center portions of the detents 58b and 58d.

The locking legs, or retaining members, 72 and 74 are disposed between the arcuate members 68 and 70, as may be seen in FIGURES 9 and 10. As may be seen in FIGURE 11, locking leg 72 is defined by a web portion 120 having an upper surface 122 and a lower surface 124. The web portion 120 supports a resilient, movable portion 126 defined by surfaces 128 and 130 which are parallel to each other and parallel to the chord surfaces 96 and 118. The movable portion 126 is further defined by walls 132 and 134 which are substantially parallel to one another, by bottom surface 136 which is at substantially right angles to wall 132, and by walls 138 and 140 which are formed at an angle to surface 134 and extend inwardly to define an inwardly projecting lip 144.

Similarly, the retaining member 74 is defined by a web portion 146 having an upper surface 148 and a lower surface 150, a movable portion 152 defined by surfaces 154 and 156 parallel to each other and parallel to the chord surfaces 96 and 118. The movable portion 152 is further defined by walls 158 and 160 which are substantially parallel to one another, by bottom surface 162, and by walls 164 and 166 which define an inwardly projecting lip 170.

As may best be seen in FIGURES 12, 13 and 14 the socket retainer 22 is substantially round, thin and flat with attached electrical conductors. The socket retainer is defined by an upper surface 180, a lower surface 182, and an outer periphery 184 which is substantially circular and concentric about axis 66 in the assembled position but having a chord portion 186 which is substantially straight. The socket retainer 22 further has an orifice 188 defined in it by an inner peripheral surface 190 which is substantially circular in configuration and concentric about axis 66.

The socket retainer 22 has notches 192 and 194 defined in it to receive electrical conductors 38 and 40 within its maximum periphery. The conductors are fixed in place, for instance, by heat sealed bosses 196 and 198.

The orifice 188 is larger than the outer surfaces 84 and 106 of the arcuate portions 82 and 104 of the socket 20. The arcuate portions 82 and 104 extend below the lower surface 54 of the socket 20. In the assembled position, the lower surface 54 of the flange 50 of the socket 20 is in contact with the upper surface 180 of the socket retainer. The arcuate portions 82 and 104 extend into the orifice 188 and restrain the socket from undue lateral motion while permitting free rotation about the central axis 66.

As may be seen in FIGURES 12–15, the electrical conductors 38 and 40 have a particular configuration adapted to the illustrated embodiments of the present invention. The electrical conductors are preferably formed from thin sheets of conductive metal by well known stamping and bending means. The electrical conductor 38 is comprised of a flat portion 200 having segments 202 and 204 substantially at right angles to each other. Segment 204 contains an orifice 206 adapted to receive the boss 196. A segment 208 is formed at right angles to segment 204. Another segment 210 extends downwardly at an angle of less than 90 degrees from the plane of segment 204 and has a lip 212 to provide easy engagement with a contacting member. A segment 214 is formed in a plane at right angles to that of segment 202 and has a segment 216 formed in the same plane with it, but extending generally at right angles to it. Segment 218 is bendably connected to one edge of segment 216 and extends away from its plane at a slight angle generally away from the axis of rotation 66. Lip 220 is formed at the end of segment 218 to permit ease in contacting other electrical conductors.

Similarly, the electrical conductor 40 is comprised of a flat portion 222 having a portion 224 lying in the same plane with it but at right angles to it. Portion 224 contains an orifice 226 to engage the boss 198 and permit heat sealing of the electrical conductor 40 into position. A segment 228 is formed at right angles to portion 224. A segment 230 extends downwardly at an angle of less than 90 degrees from the plane of segment 240 and has a lip 232 formed at its distal portion to permit engagement with a coacting conductor, as will be described below. A segment 234 is formed in a plane at right angles to that of segment 222 and has a segment 236 formed in the same plane with it but extending generally at right angles to it. Segment 238 is bendably connected to one edge of segment 236 and extends away from its plane at a slight angle generally away from the axis of rotation 66. Lip 240 is formed at the end of segment 238 to permit ease in contacting other electrical conductors.

When conductor 38 is connected to socket retainer 22, as shown in FIGURES 12–14, the portion 202 is in contact with the lower surface 182 and the conductor 38 is held in place by heat forming the boss 196 extending through the orifice 206. The segment 210 is disposed below the orifice 188 in a direction generally away from the retainer 22. The segment 214 passes through the notch 192 so that the surface 218 extends above the upper surface 180.

Similarly, the flat portion 222 of the electrical conductor 40 is disposed adjacent the lower surface 182 of the socket retainer 22 and is held in position by the heat fused boss 198 extending through the orifice 226. The contact segment 230 is positioned under the orifice 188 and extends generally away from the surface 182. The segment 234 passes through the notch 194 so that the contact portion 238 is disposed above the upper surface 180 of the retainer 22, as may be best seen in FIGURES 13 and 14.

In operation the flashcube is inserted in the flashcube base 10 in socket 20 with one of the faces of the flashcube aligned toward the front of the camera. Two of the fingers 127 of the flashcube base are received in slots 88 and 110. The other two fingers of the flashcube base are engaged by the locking legs 72 and 74. The structure of the adapter automatically aligns the flashcube connector pins with the electrical conductors 38 and 40 fastened to the socket retainer 22, which in turn make contact through the electrical conductors with the batteries. When the shutter is actuated to expose the film, an electrical current simultaneously passes through one bulb of the flashcube, burning the wire and producing illumination for proper exposure of the film.

The flashcube may then be manually rotated in either direction to bring the next successive flash bulb of the flashcube toward the front of the camera. The spring 59 and one of the detents 58a, 58b, 58c and 58d serve to align the pins of the flashcube in position to connect to the conductors 38 and 40, and the cycle is repeated. After the second exposure the third bulb of the flashcube may be rotated into position in the same fashion. Similarly after the third exposure the fourth bulb of the flashcube may be rotated into position as described above.

After all four flash bulbs of the flashcube have been fired, the push rod 26 is depressed causing the ejector 24 to mechanically engage the base of the flashcube and urge it out of engagement with the locking legs 72 and 74. When the push rod is released it is returned to the open position by the spring 28. The act of inserting a flashcube returns the ejector 24 to its operating position.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A camera flash unit for use with a flashcube comprising a housing, a socket retainer disposed within said housing, a flashcube socket disposed between said retainer and said housing, first and second electrical conductors connected to said socket retainer and adapted to connect to the contact pins of one flash bulb portion of a flashcube and to a source of electrical energy disposed within the camera flash unit, said socket being adapted to be manually rotated within said retainer so that contact pins of successive flash bulb portions of the flashcube may be rotated into contact with said first and second electrical conductors, wherein said flashcube socket comprises: a cylindrical wall portion having an aperture therein for receiving the base of a flashcube and for preventing it from rotating within said aperture, and a locking portion integral with said cylindrical wall portion and comprising a first and a second flexible locking leg spaced apart from each other and extending into said aperture for engaging said flashcube base to releasably hold it in said aperture of said cylindrical wall portion when fully seated therein.

2. A camera flash unit as described in claim 1, wherein said first and second locking legs each include an inwardly projecting lip adapted to removably engage a portion of said flashcube base, said legs flexing outwardly for insertion and removal of the flashcube supporting member.

3. A camera flash unit as described in claim 2 wherein said socket retainer further comprises
   (a) a substantially planar annulus, the inner diameter of said annulus being larger than said cylindrical wall of said socket to permit said socket to rotate within said retainer,
   (b) first and second electrical conductors connected to said annulus, and adapted to engage the contact pins on one flash bulb portion of a flashcube on one side of said socket retainer and to connect to the operating mechanism of the flash unit.

4. An adaptor for adapting a camera flash unit designed for use with AG-1 flash bulbs to use with flashcubes comprising a housing, a socket retainer disposed within said housing, a flashcube socket disposed between said retainer and said housing, first and second electrical conductors connected to said socket retainer and adapted to connect the contact pins of one flash bulb portion of a flashcube to a source of electrical energy disposed external to said apparatus; said first and second electrical conductors being of such configuration as to removably engage an AG-1 flash bulb socket and retain said adaptor adjacent said AG-1 flash bulb socket; said flashcube socket being adapted to be manually rotated within said retainer so that contact pins of successive flash bulb portions of the flashcube may be rotated into contact with said first and second electrical conductors.

5. In a photographic camera having a flash unit for use with a flashcube, an all plastic flashcube retaining socket comprising a cylindrical body portion having an aperture therein for receiving the base of a flashcube and for preventing it from rotating within said aperture, a locking portion integral with said body portion and comprising two flexible spaced apart legs extending into said aperture for engaging said flashcube base to releasably hold it in said body portion when fully seated therein.

6. In a photographic camera having a flash unit for use with a flashcube, an all plastic flashcube retaining socket according to claim 5 which includes a flange portion also integral with said body portion but extending radially outwardly a distance therefrom and having a plurality of equally spaced detents extending inwardly from the periphery thereof to enable the socket to be rotated to and maintained in a properly aligned position for firing each bulb in the flashcube seated in said socket.

References Cited

UNITED STATES PATENTS

| | | | |
|---|---|---|---|
| 2,154,160 | 4/1939 | Hamilton | 339—41 |
| 3,309,513 | 3/1967 | Aymar | 95—11 X |
| 3,312,086 | 4/1967 | Casebeer et al. | 240—1.3 X |
| 3,319,547 | 5/1967 | Parsons et al. | 240—1.3 X |
| 3,319,548 | 5/1967 | Kottler. | |

RICHARD E. MOORE, *Primary Examiner.*

Disclaimer 3,399,376.—*Venerio J. Rigolini*, Brooklyn, N.Y. PHOTOGRAPHIC APPARATUS. Patent dated Aug. 27, 1968. Disclaimer filed Nov. 29, 1968, by the assignee, *Whitehouse Products, Inc.*

Hereby enters this disclaimer to claims 5 and 6 of said patent.

[*Official Gazette March 11, 1969.*]